United States Patent
Yamaguchi et al.

(10) Patent No.: US 9,945,687 B2
(45) Date of Patent: Apr. 17, 2018

(54) TRAVEL ROUTE DISPLAY DEVICE, TRAVEL ROUTE DISPLAY METHOD AND TRAVEL ROUTE DISPLAY PROGRAM

(71) Applicant: The Yokohama Rubber Co., LTD., Minato-ku, Tokyo (JP)

(72) Inventors: Yukihito Yamaguchi, Hiratsuka (JP); Kazunori Yamawaki, Hiratsuka (JP); Naoshi Miyashita, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 24 days.

(21) Appl. No.: 14/896,297

(22) PCT Filed: Jun. 6, 2014

(86) PCT No.: PCT/JP2014/065103
§ 371 (c)(1),
(2) Date: Dec. 4, 2015

(87) PCT Pub. No.: WO2014/196633
PCT Pub. Date: Dec. 11, 2014

(65) Prior Publication Data
US 2016/0138933 A1    May 19, 2016

(30) Foreign Application Priority Data
Jun. 7, 2013 (JP) .................................. 2013-120794

(51) Int. Cl.
*G08G 1/123* (2006.01)
*G01C 21/36* (2006.01)
(Continued)

(52) U.S. Cl.
CPC ..... *G01C 21/3635* (2013.01); *G01C 21/3667* (2013.01); *G01C 21/3691* (2013.01);
(Continued)

(58) Field of Classification Search
CPC ............ G01C 21/3667; G01C 21/3691; G01C 21/3697; G06T 3/0031; G06T 15/04;
(Continued)

(56) References Cited

U.S. PATENT DOCUMENTS 6,157,342 A * 12/2000 Okude ............... G01C 21/3635
340/995.14
6,175,802 B1    1/2001 Okude et al.
(Continued)

FOREIGN PATENT DOCUMENTS

| CN | 101536056 | 9/2009 |
| JP | H09-053946 | 2/1997 |

(Continued)

OTHER PUBLICATIONS

Chinese Office Action for Chinese Patent Application No. 201480031572.4 dated Sep. 27, 2016, 9 pages.
(Continued)

*Primary Examiner* — Maceeh Anwari
(74) *Attorney, Agent, or Firm* — Thorpe North & Western

(57) ABSTRACT

A travel route display device (1) includes a display unit (130), a topographical data storage unit (110b) that stores three-dimensional topographical data, a travel data storage unit (110c) that stores travel data relating to a travel route of a vehicle and a driving status of the vehicle on the travel route, and a control unit (120) that, when displaying the topographical data stored in the topographical data storage unit (110b) on the display unit (130), simultaneously displays, on the display unit (130), the travel route indicated by the travel data stored in the travel data storage unit (110c) in a display mode that corresponds to the driving status.

17 Claims, 10 Drawing Sheets

(51) Int. Cl.
    *G09B 29/00*     (2006.01)
    *G09B 29/12*     (2006.01)
    *G06T 3/00*     (2006.01)
    *G06T 15/04*     (2011.01)
    *G09B 29/10*     (2006.01)

(52) U.S. Cl.
    CPC ........ *G01C 21/3697* (2013.01); *G06T 3/0031* (2013.01); *G06T 15/04* (2013.01); *G09B 29/006* (2013.01); *G09B 29/007* (2013.01); *G09B 29/106* (2013.01); *G09B 29/12* (2013.01)

(58) Field of Classification Search
    CPC .. G09B 29/006; G09B 29/007; G09B 29/106; G09B 29/12
    USPC ........................................................ 701/532
    See application file for complete search history.

(56) References Cited

U.S. PATENT DOCUMENTS

| | | |
|---|---|---|
| 6,341,254 B1 | 1/2002 | Okude et al. |
| 6,470,265 B1 | 10/2002 | Tanaka |
| 2002/0038181 A1 | 3/2002 | Okude et al. |
| 2005/0267678 A1 | 12/2005 | Sugiura |
| 2010/0004859 A1 | 1/2010 | Smirnov |
| 2010/0087977 A1 | 4/2010 | Bonne |
| 2013/0091472 A1* | 4/2013 | Terai ................ G01C 21/20 715/856 |

FOREIGN PATENT DOCUMENTS

| | | |
|---|---|---|
| JP | H10-0143066 | 5/1998 |
| JP | H10-0332393 | 12/1998 |
| JP | H11-184375 | 7/1999 |
| JP | 2001-331832 | 11/2001 |
| JP | 2001331832 * | 11/2001 |
| JP | 2005-345201 | 12/2005 |
| JP | 2007-278911 | 10/2007 |
| JP | 2012-026844 | 2/2012 |
| JP | 2012-203662 | 10/2012 |
| WO | WO 1999/34346 | 7/1999 |
| WO | WO 2008/058784 | 5/2008 |
| WO | WO 2008/098663 | 8/2008 |
| WO | WO 2012/011226 | 1/2012 |

OTHER PUBLICATIONS

International Search Report for International Application No. PCT/JP2014/065103 dated Sep. 2, 2014, 6 pages, Japan.

* cited by examiner

| VEHICLE | MEASUREMENT TIME | POSITION | SPEED | ACCELERATION | GRADIENT | ELEVATION |
|---|---|---|---|---|---|---|
| M1 | T1 | X1, Y1 | V1 | α1 | θ1 | Z1 |
| | T2 | X2, Y2 | V2 | α2 | θ2 | Z2 |
| | T3 | X3, Y3 | V3 | α3 | θ3 | Z3 |
| | ... | ... | ... | ... | ... | ... |
| M2 | T11 | X11, Y11 | V11 | α11 | θ11 | Z11 |
| | T12 | X12, V12 | V12 | α12 | θ12 | Z12 |
| | T13 | X13, Y13 | V13 | α13 | θ13 | Z13 |
| | ... | ... | ... | ... | ... | ... |

FIG. 3

TRAVEL ROUTE DISPLAY DEVICE, TRAVEL ROUTE DISPLAY METHOD AND TRAVEL ROUTE DISPLAY PROGRAM

TECHNICAL FIELD

The present technology relates to a travel route display device, a travel route display method and a travel route display program.

BACKGROUND

In recent years, navigation systems that use a global positioning system (GPS) to measure the position, speed, and the like of a vehicle and display such on an in-vehicle monitor with the aim of supporting the travel of the vehicle have been widely used. For example, an eco-drive support device that displays a graph indicating the current travel status on a display on the basis of positioning data from a GPS receiver is disclosed in Japanese Unexamined Patent Application Publication No. 2007-278911A.

Some systems including, for example, widely used navigation systems display the driving status of a vehicle such as the position and speed of the vehicle on two-dimensional data that includes a travel route. However, in methods for displaying the driving status of a vehicle, there remains room for alterations corresponding to the usage purpose of the operation status.

SUMMARY

The present technology has been made in view of the aforementioned circumstances, and provides a travel route display device, a travel route display method and a travel route display program which allow the driving status of a vehicle to be displayed in an easy-to-understand manner.

The present technology includes: a display unit; a topographical data storage unit that stores three-dimensional topographical data; a travel data storage unit that stores travel data relating to a travel route of a vehicle and a driving status of the vehicle on the travel route; and a control unit that, when displaying the topographical data stored in the topographical data storage unit on the display unit, simultaneously displays, on the display unit, the travel route indicated by the travel data stored in the travel data storage unit in a display mode that corresponds to the driving status.

Furthermore, the present technology is a computer-executable travel route display method that allows a computer to execute the steps of: acquiring three-dimensional topographical data from a topographical data storage unit that stores the topographical data; acquiring travel data relating to a travel route of a vehicle and a driving status of the vehicle on the travel route from a travel data storage unit that stores the travel data; and, when displaying the topographical data on the display unit, simultaneously displaying, on the display unit, the travel route indicated by the travel data stored in the travel data storage unit in a display mode that corresponds to the driving status.

Furthermore, the present technology allows a computer to execute the steps of: acquiring three-dimensional topographical data from a topographical data storage unit that stores the topographical data; acquiring travel data relating to a travel route of a vehicle and a driving status of the vehicle on the travel route from a travel data storage unit that stores the travel data; and, when displaying the topographical data on the display unit, simultaneously displaying, on the display unit, the travel route indicated by the travel data stored in the travel data storage unit in a display mode that corresponds to the driving status.

BRIEF DESCRIPTION OF THE DRAWING(S)

FIG. 3 is a table showing an example of data configuration of travel data.

DETAILED DESCRIPTION

Hereinafter, a mode (hereinafter, referred to as an embodiment) for carrying out the present technology, which is a technology disclosed by the present application, will be described in detail with reference to the drawings. It should be noted that the present technology is not restricted by the embodiments described hereinafter. Furthermore, technical matters described in the following embodiments include those that are easily conceived by a person skilled in the art and that are substantially the same. In addition, it is possible for the technical matters described in the following embodiments to be combined as appropriate within the scope deemed necessary to achieve the object of the present technology.

Figure 1:
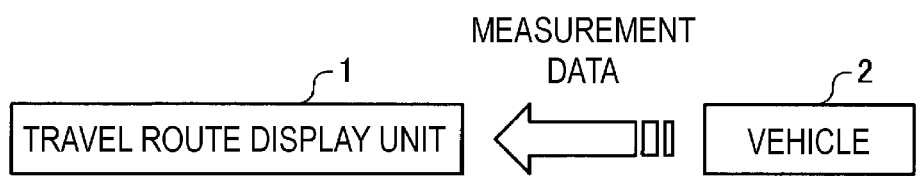
FIG. 1 is a diagram illustrating an example of an overall configuration according to a present embodiment.

FIG. 1 is a diagram illustrating an example of an overall configuration according to a present embodiment. A measurement instrument such as a GPS receiver for measuring a driving status (travel status) is mounted on a vehicle 2. The GPS receiver receives signals from a plurality of satellites and thereby measures the position and elevation (altitude) of the vehicle 2 in a three-dimensional manner. The use of the position and elevation measured using the GPS receiver in a time series manner make it possible to calculate, for example, the speed, acceleration, and tilt (the gradient of the surface on which the vehicle 2 is traveling) of the vehicle 2. The GPS receiver may be capable of measuring or calculating, for example, time, speed, vertical speed, orientation, longitudinal acceleration, lateral acceleration, and movement distance. The GPS receiver may be capable of calculating the tilt of the vehicle 2 (gradient) on the basis of signals received by antennas provided in a plurality of sections of the vehicle 2. A receiver of another system that performs positioning using a satellite may be mounted on the vehicle 2. Instead of the GPS receiver or in addition to the GPS receiver, a measurement instrument such as speed meter, an acceleration sensor, a gyro sensor, an atmospheric pressure sensor or a temperature sensor may be mounted on the vehicle 2 in order to measure the driving status. The vehicle 2 records information measured in a prescribed period by the measurement instrument as measurement data.

The travel route display device 1 acquires the measurement data from the vehicle 2. The travel route display device 1 may acquire the measurement data through wireless communications from the vehicle 2, may acquire the measurement data through a wired connection, or may acquire the measurement data by way of a storage medium. The travel route display device 1 is capable of acquiring the measurement data from a plurality of vehicles 2.

Figure 2:
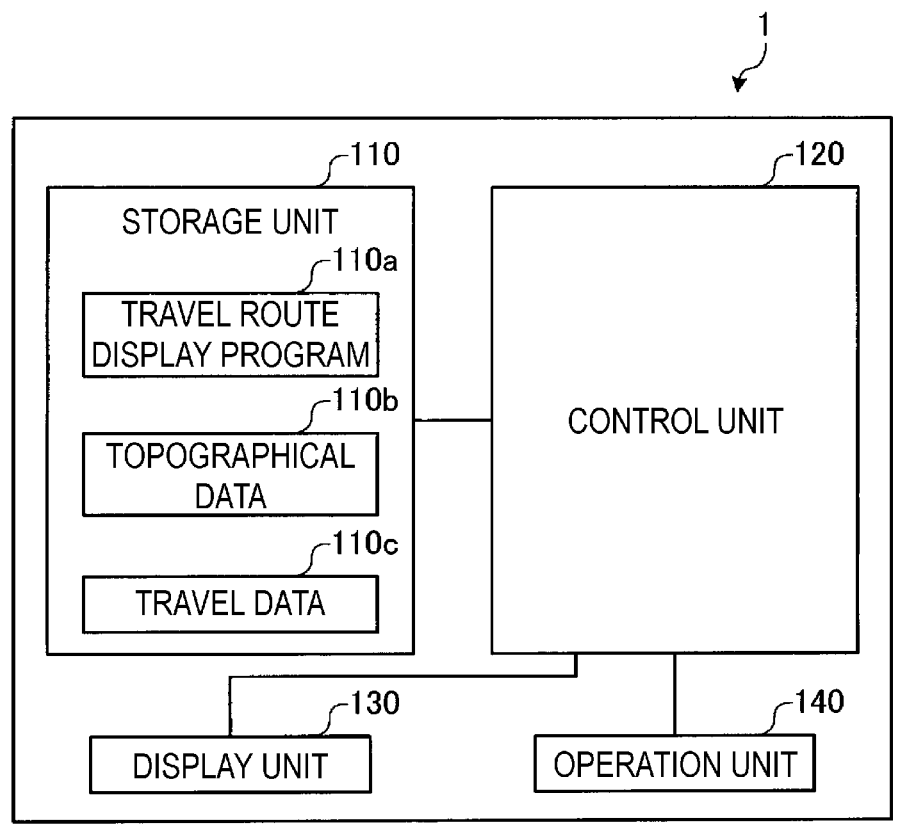
FIG. 2 is a block diagram illustrating an example of a functional configuration of a travel route display device 1 according to the present embodiment.

FIG. 2 is a block diagram illustrating an example of a functional configuration of the travel route display device 1 according to the present embodiment. FIG. 2 illustrates only functional units required to describe the functional configuration of the travel route display device 1 according to the present embodiment. As illustrated in FIG. 2, the travel route display device 1, which is an information processing device such as a personal computer, includes a storage unit 110, a control unit 120, a display unit 130, and an operation unit 140.

The storage unit 110 stores data and a program required for various processing performed by the control unit 120. The storage unit 110 includes a non-volatile memory (a read-only storage medium such as a CD-ROM) such as a hard disk device, a magneto-optical disk device or a flash memory, a volatile memory such as a random access memory (RAM), or a combination thereof.

In the present embodiment, the storage unit 110 stores, for example, a travel route display program 110*a*, topographical data 110*b*, and travel data 110*c*, as illustrated in FIG. 2.

The travel route display program 110*a* provides a function for, when displaying the topographical data 110*b* on the display unit 130, simultaneously displaying, on the display unit 130, a travel route indicated by the travel data 110*c* in a display mode that corresponds to the driving status of the vehicle 2.

The topographical data 110*b* is data to be displayed on the display unit 130, which is a three-dimensional image of the shape of a field on which the vehicle 2 travels.

Travel data 110*c* corresponds to data relating to the travel route of the vehicle 2 and data relating to the driving status of the vehicle 2 on the travel route. The travel data 110*c* retains, in association with the position of the vehicle 2, data relating to the speed of the vehicle 2, acceleration of the vehicle 2, gradient of the vehicle 2, and elevation of the vehicle 2 as the driving status of the vehicle 2. FIG. 3 is a table showing an example of the data configuration of the travel data. As shown in FIG. 3, the travel data 110*c* is retained for each vehicle (for example, M1 and M2). The travel data 110*c* includes: measurement time (for example, T1); the position of the vehicle at the measurement time (for example, X1 and Y1); the speed of the vehicle at the measurement time (for example, V1); the acceleration of the vehicle at the measurement time (for example, $\alpha 1$); the gradient of the vehicle at the measurement time (for example, $\theta 1$); and the elevation of the vehicle at the measurement time (for example, Z1). From among the travel data 110*c*, data relating to the position of the vehicle 2 measured in three dimensions in a time series manner corresponds to data relating to the travel route, and data relating to, for example, the speed, acceleration, gradient, and elevation of the vehicle 2 measured in three dimensions in a time series manner corresponds to data relating to the driving status of the vehicle.

It should be noted that the data configuration shown in FIG. 3 is an example and, besides those shown in FIG. 3, vertical speed, orientation, longitudinal acceleration, lateral acceleration, movement distance, atmospheric pressure changes, temperature changes, and the like may be stored as the travel data 110*c*. Furthermore, the numerical values included in the travel data 110*c* shown in FIG. 3 may be actual numerical values included in the measurement data acquired from the vehicle 2, or may be values that are calculated using the numerical values included in the measurement data acquired from the vehicle 2. For example, the acceleration and gradient may be calculated on the basis of the difference between numerical values corresponding to preceding and succeeding measurement times included in the measurement data.

The measurement time is a time at which the measurement instrument measures the position of the vehicle 2. In the case where the travel route display device is capable of acquiring measurement data through, for example, wireless communications in substantially real time, the measurement time may be the time at which the travel route display device 1 acquires the measurement data from the vehicle 2. The gradient of the vehicle 2 corresponds to the tilt in the advancement direction in which the vehicle 2 is traveling. The elevation of the vehicle 2 corresponds to the altitude (height above sea level) of the position in which the vehicle 2 is traveling.

The control unit 120 executes various processing. The control unit 120 is a computation device such as a central processing unit (CPU).

The control unit 120 stores measurement data acquired from the vehicle 2, as the travel data 110*c* in the storage unit 110. The control unit 120 may store values calculated using values included in the measurement data acquired from the vehicle 2, as the travel data 110*c* in the storage unit 110. The control unit 120 may discard, without storing in the storage unit 110, data having a high possibility of being erroneous (for example, data in which the difference between or ratio of preceding and succeeding measurement times is larger than a threshold value) from among the measurement data acquired from the vehicle 2.

In addition, the control unit 120 executes the travel route display program 110*a* stored in the storage unit 110, thereby, when displaying the topographical data 110*b* on the display unit 130, simultaneously displaying, on the display unit 130, the travel route indicated by the travel data 110*c* in a display mode that corresponds to the driving status of the vehicle 2.

Specifically, the control unit 120 draws the travel route indicated by the travel data 110*c* as a line, and changes the color of the line on the travel route on the basis of the driving status included in the travel data 110*c*. For example, the control unit 120 changes the color of the line in stages in accordance with changes in speed on the travel route (multistage display). For example, the control unit 120 sets the color of the line of a portion where the speed is equal to or greater than a prescribed value on the travel route to be a color that is different from those of other portions (two-stage display). For example, the control unit 120 changes the color of the line in stages in accordance with changes in gradient on the travel route (multistage display). For example, the control unit 120 sets the color of the line of a portion where the gradient is equal to or greater than a prescribed value on the travel route to be a color that is different from those of other portions (two-stage display). For example, the control unit 120 changes the color of the line in stages in accordance with changes in acceleration on the travel route (multistage display). For example, the control unit 120 sets the color of the line of a portion where the acceleration is equal to or greater than a prescribed value on the travel route to be a color that is different from those of other portions (two-stage display).

Furthermore, the control unit 120 draws the travel route indicated by the travel data 110c as a line, and changes the width of the line on the travel route on the basis of the driving status included in the travel data 110c. For example, the control unit 120 sets the width of the line of a portion where the speed is equal to or greater than the prescribed value on the travel route to be wider than those of other portions. For example, the control unit 120 sets the width of the line of a portion where the gradient is equal to or greater than the prescribed value on the travel route to be wider than those of other portions. For example, the control unit 120 sets the width of the line of a portion where the acceleration is equal to or greater than the prescribed value on the travel route to be wider than those of other portions. For example, the control unit 120 sets the width of the line of a portion where at least two of the speed, gradient and acceleration are equal to or greater than the prescribed values to be wider than those of other portions.

The control unit 120 may set the width of the line to be uniform in all portions where the width of the line is increased, or may perform adjustment such that the width of the line increases as the amount of deviation from the prescribed value increases. In the case where a portion where the speed is equal to or greater than the prescribed value and a portion where the gradient is equal to or greater than the prescribed value are simultaneously displayed, the control unit 120 may change the display mode such that, for example, the width of the line of the portion where the speed is equal to or greater than the prescribed value is made wider than those of other portions and the color of the portion where the gradient is equal to or greater than the prescribed value becomes a color that is different from those of other portions, or vice versa. The control unit 120 may also change, in the same method, the display mode for the travel route in a combination of the acceleration and speed and in a combination of the acceleration and gradient.

Furthermore, the control unit 120 draws the travel route indicated by the travel data 110c as a line having a three-dimensional thickness in a direction perpendicular to the travel route, and changes the thickness on the basis of the driving status included in the travel data 110c. For example, the control unit 120 sets the thickness of the line of a portion where the speed is equal to or greater than the prescribed value on the travel route to be greater than those of other portions. For example, the control unit 120 sets the thickness of the line of a portion where the gradient is equal to or greater than the prescribed value on the travel route to be greater than those of other portions. For example, the control unit 120 sets the thickness of the line of a portion where the acceleration is equal to or greater than the prescribed value on the travel route to be greater than those of other portions. The control unit 120 sets the thickness of the line of a portion where at least two of the speed, gradient, and acceleration are equal to or greater than the prescribed values to be greater than those of other portions.

The control unit 120 may set the thickness of the line to be uniform in all portions where the thickness of the line is increased, or may perform adjustment such that the thickness of the line increases as the amount of deviation from the prescribed value increases. In the case where a portion where the speed is equal to or greater than the prescribed value and a portion where the gradient is equal to or greater than the prescribed value are simultaneously displayed, the control unit 120 may change the display mode such that, for example, the thickness of the line of the portion where the speed is equal to or greater than the prescribed value is made larger than those of other portions and the color of the portion where the gradient is equal to or greater than the prescribed value becomes a color that is different from those of other portions, or vice versa. The control unit 120 is also capable of changing, in the same method, the display mode for the travel route in a combination of the acceleration and speed and a combination of the acceleration and gradient.

Furthermore, the control unit 120 draws the travel route indicated by the travel data 110c as a dotted line that includes a plurality of dots, and changes the size of the dots included in the dotted line on the basis of the driving status included in the travel data 110c. For example, the control unit 120 sets the size of the dots of a portion where the speed is equal to or greater than the prescribed value on the travel route to be larger than those of other portions. For example, the control unit 120 sets the size of the dots of a portion where the gradient is equal to or greater than the prescribed value on the travel route to be larger than those of other portions. For example, the control unit 120 sets the size of the dots of a portion where the acceleration is equal to or greater than the prescribed value on the travel route to be larger than those of other portions. The control unit 120 sets the size of the dots of a portion where at least two of the speed, gradient, and acceleration are equal to or greater than the prescribed values to be larger than those of other portions.

The control unit 120 may set the size of the dots to be uniform in all portions where the size of the dots included in a dotted line is made larger, or may perform adjustment such that the size of the dots becomes larger as the amount of deviation from the prescribed value increases. In the case where a portion where the speed is equal to or greater than the prescribed value and a portion where the gradient is equal to or greater than the prescribed value are simultaneously displayed, the control unit 120 may change the display mode such that, for example, the size of the dots of the portion where the speed is equal to or greater than the prescribed value is made larger than those of other portions and the color of the portion where the gradient is equal to or greater than the prescribed value becomes a color that is different from those of other portions, or vice versa. The control unit 120 is also capable of changing, in the same method, the display mode for the travel route in a combination of the acceleration and speed and a combination of the acceleration and gradient.

The control unit 120, when changing the display mode for the travel route, determines whether the speed is equal to or greater than 50 kilometers per hour, whether the gradient is equal to or greater than 8%, and whether the acceleration is equal to or greater than 0.25 G, for example. These threshold values are effective for explicitly displaying sections in which a load on the tires of the vehicle is large and thus the tires may become worn more quickly, for example. It should be noted that the numerical values for determining the speed, gradient, and acceleration are examples, and these numerical values may be changed as appropriate according to conditions such as the weight of the vehicle 2 and items loaded thereon, for example.

Furthermore, the control unit 120, when displaying the travel route, may add information indicating the advancement direction of the vehicle. The control unit 120 is capable of displaying a line that indicates the travel route of the vehicle as an arrow such as one that indicates the advancement direction of the vehicle and of displaying an arrow that indicates the advancement direction of the vehicle in the vicinity of a line that indicates the travel route of the vehicle, for example.

The display unit 130 simultaneously displays a topographical image that is based on the topographical data 110b and an image in which the travel route indicated by the travel data 110c has been altered in accordance with a display mode that corresponds to the driving status of the vehicle 2. The display unit 130 is configured to include a display device such as a display or a monitor.

The operation unit 140 receives various operational inputs of a user. The operation unit 140 receives a selection operation for a vehicle 2 for which the travel route is to be displayed on the display unit 130, for example. The operation unit 140 is configured to include an input device such as a keyboard or a mouse.

Next, a travel route display method according to the present embodiment will be described with reference to FIGS. 4 to 8. It should be noted that the travel route display method according to the present embodiment is realized by the aforementioned control unit 120 reading and executing the travel route display program 110a.

Figure 4:
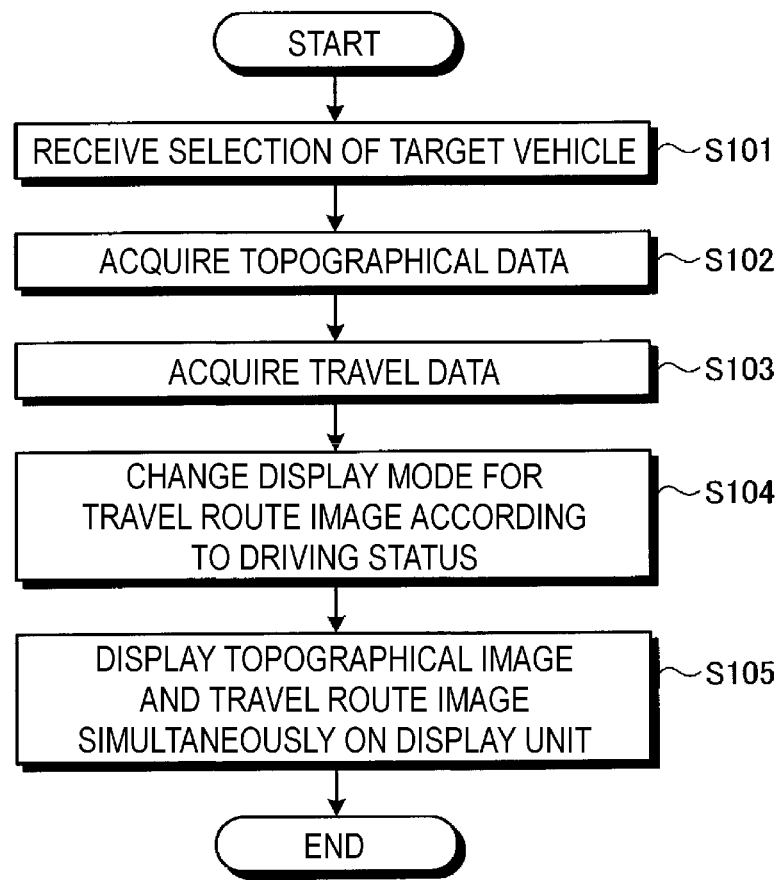
FIG. 4 is a flowchart illustrating a processing procedure of a travel route display method according to the present embodiment.

FIG. 4 is a flowchart illustrating the processing procedure of the travel route display method according to the present embodiment. FIGS. 5 to 8 are drawings illustrating examples of topographical images and travel route images which are displayed simultaneously on the display unit.

As illustrated in FIG. 4, the control unit 120, upon receiving the selection of a target vehicle for which the travel route is to be displayed (step S101) by way of the operation unit 140, for example, acquires the topographical data 110b from the storage unit 110 (step S102) as well as the travel data 110c of the target vehicle (step S103).

Then, the control unit 120 changes the travel route indicated by the travel data 110c in accordance with a display mode that corresponds to the driving status of the vehicle 2 (step S104).

Specifically, the control unit 120 draws the travel route indicated by the travel data 110c as a line, and changes the color of the line on the travel route on the basis of the driving status included in the travel data 110c. For example, the control unit 120 sets the color of the line of a portion where the speed is equal to or greater than the prescribed value and a portion where the gradient is equal to or greater than the prescribed value on the travel route to be a color that is different from those of other portions.

Alternatively, the control unit 120 draws the travel route indicated by the travel data 110c as a line, and changes the width of the line on the travel route on the basis of the driving status included in the travel data 110c. For example, the control unit 120 sets the width of the line of a portion where the speed is equal to or greater than the prescribed value, a portion where the gradient is equal to or greater than the prescribed value, or a portion where the speed and gradient are equal to or greater than the prescribed values on the travel route to be wider than those of other portions.

Alternatively, the control unit 120 draws the travel route indicated by the travel data 110c as a dotted line that includes a plurality of dots, and changes the size of the dots included in the dotted line on the basis of the driving status included in the travel data 110c. For example, the control unit 120 sets the size of the dots of a portion where the speed is equal to or greater than the prescribed value, a portion where the gradient is equal to or greater than the prescribed value, or a portion where the speed and gradient are equal to or greater than the prescribed values on the travel route to be larger than those of other portions.

As another alternative, the control unit 120 may draw the travel route indicated by the travel data 110c as a line having a three-dimensional thickness in a direction perpendicular to the travel route, and changes the thickness on the basis of the driving status included in the travel data 110c.

Figure 5:
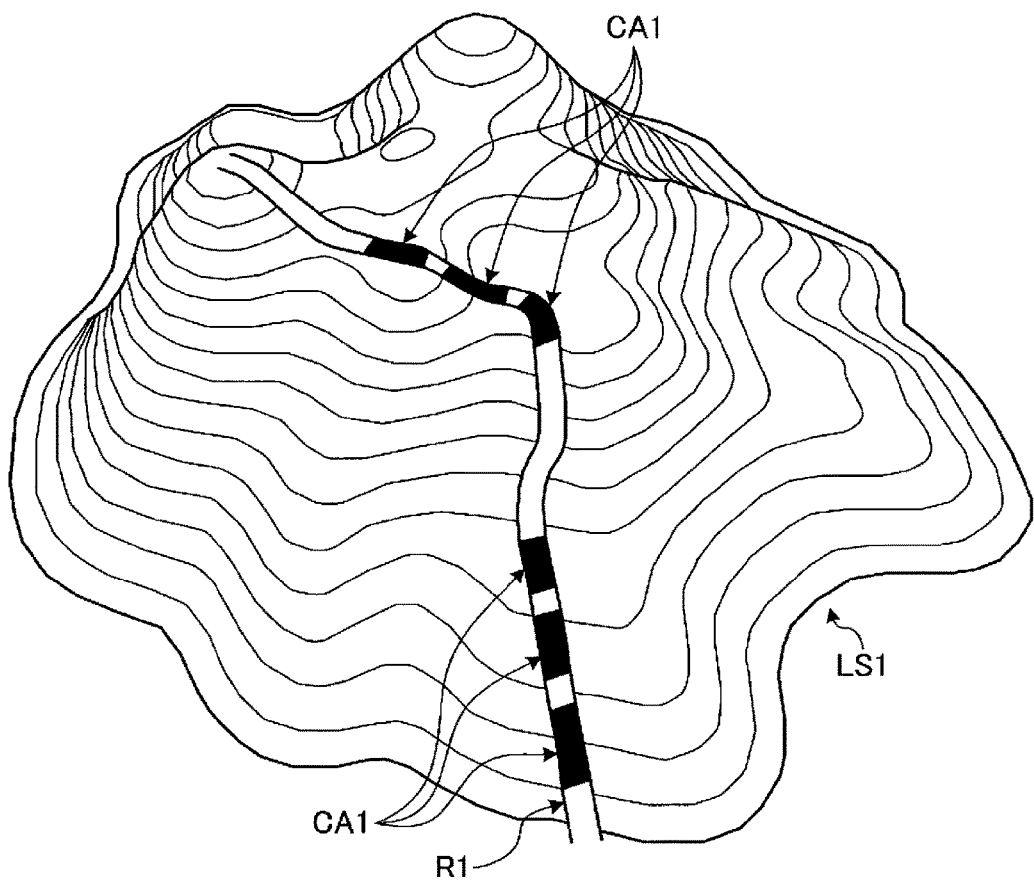
FIG. 5 is a drawing illustrating an example of a topographical image and a travel route image displayed simultaneously on a display unit.
Figure 6:
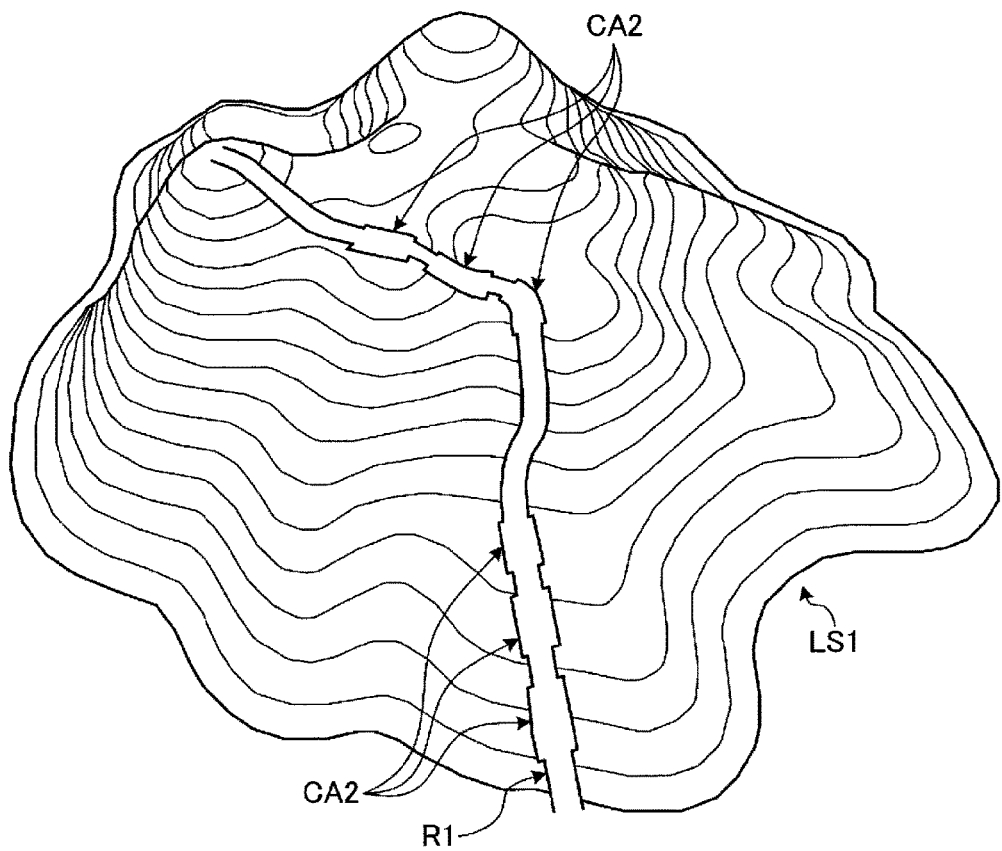
FIG. 6 is a drawing illustrating an example of a topographical image and a travel route image displayed simultaneously on a display unit.
Figure 7:
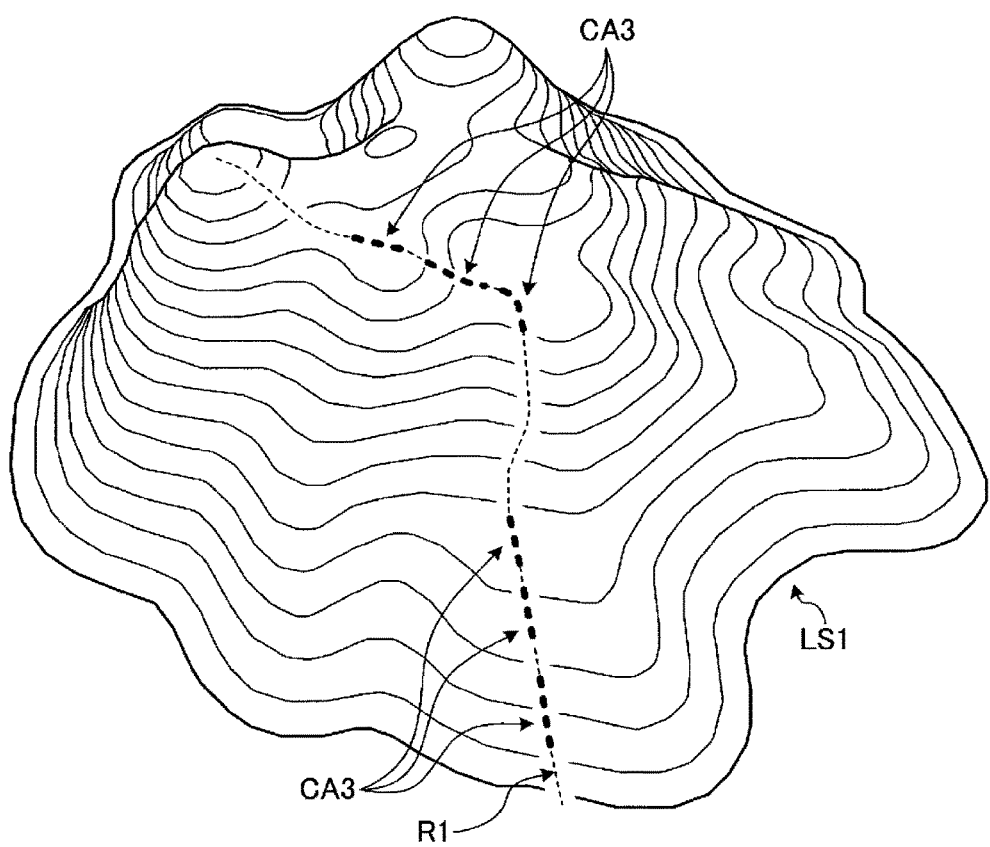
FIG. 7 is a drawing illustrating an example of a topographical image and a travel route image displayed simultaneously on a display unit.
Figure 8:
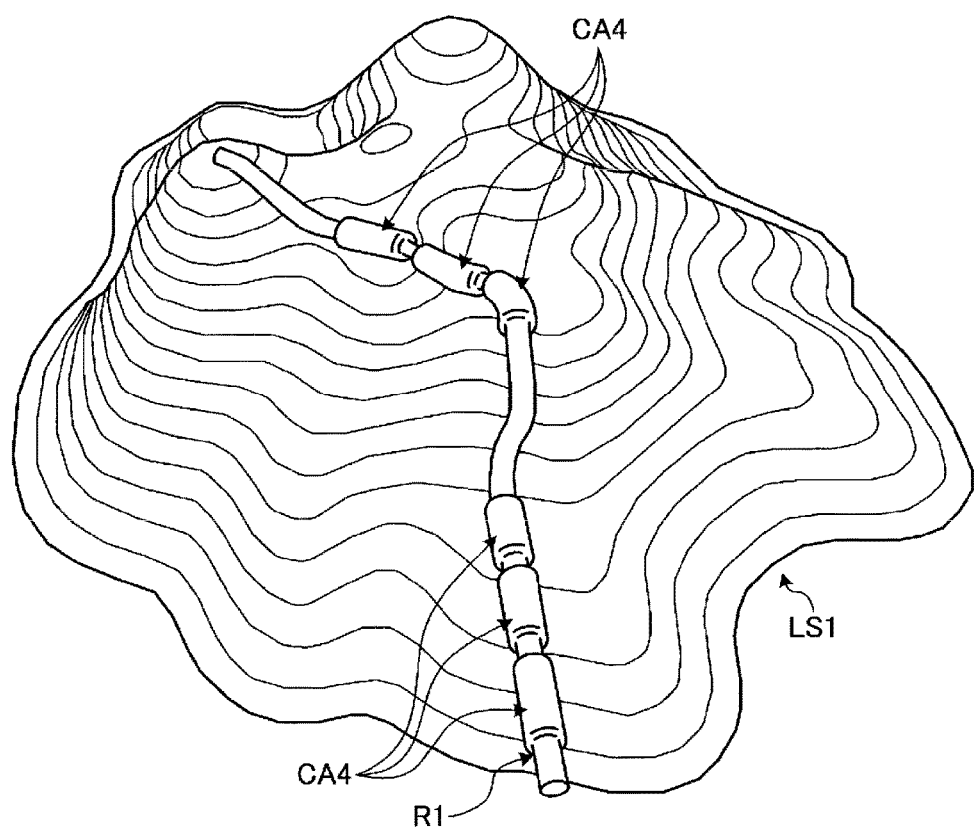
FIG. 8 is a drawing illustrating an example of a topographical image and a travel route image displayed simultaneously on a display unit.

Then, the control unit 120 simultaneously displays, on the display unit 130, a topographical image that is based on the topographical data 110b and a travel route image for which the display mode has been changed in step S104 (step S105), and then terminates the processing illustrated in FIG. 4. The control unit 120, for example, acquires appropriate data from among the topographical data 110b on the basis of position data included in the travel data 110c of the target vehicle and generates a three-dimensional topographical image. Then, the control unit 120 combines the three-dimensional typographical image and the travel route image for which the display mode has been changed according to the driving status, and simultaneously displays the images on the display unit 130. FIGS. 5 to 8 illustrate states in which a topographical image LS1 and a travel route image R1 are displayed simultaneously on the display unit 130. Color-changed portions CA1 illustrated in FIG. 5 are portions that match a change condition of a display mode on a travel route R1, and are displayed in a color that is different from those of other portions on the travel route R1. Line width-changed portions CA2 illustrated in FIG. 6 are portions that match a change condition of a display mode on the travel route R1, and are displayed with a width that is different from those of other portions on the travel route R1. Dot size-changed portions CA3 illustrated in FIG. 7 are portions that match a change condition of a display mode on the travel route R1, and are displayed with a size that is different from those of other portions on the travel route R1. Thickness-changed portions CA4 illustrated in FIG. 8 are portions that match a change condition of a display mode on the travel route R1, and are displayed with a thickness that is different from those of other portions on the travel route R1.

As described above, the travel route display device 1 according to the present embodiment, when displaying the topographical data 110b on the display unit 130, simultaneously displays, on the display unit 130, a travel route indicated by the travel data 110c in a display mode that corresponds to the driving status of the vehicle 2. For example, the travel route display device 1 displays, together with a topographical image, a travel route image in which a portion to be displayed where at least one of the speed, gradient, and acceleration is equal to or greater than a prescribed value has been altered. Thus, the present embodiment makes it possible to display the driving status of the vehicle 2 in an easy-to-understand manner with a method that is different from, for example, conventional navigation systems.

Other Embodiments

Figure 9:
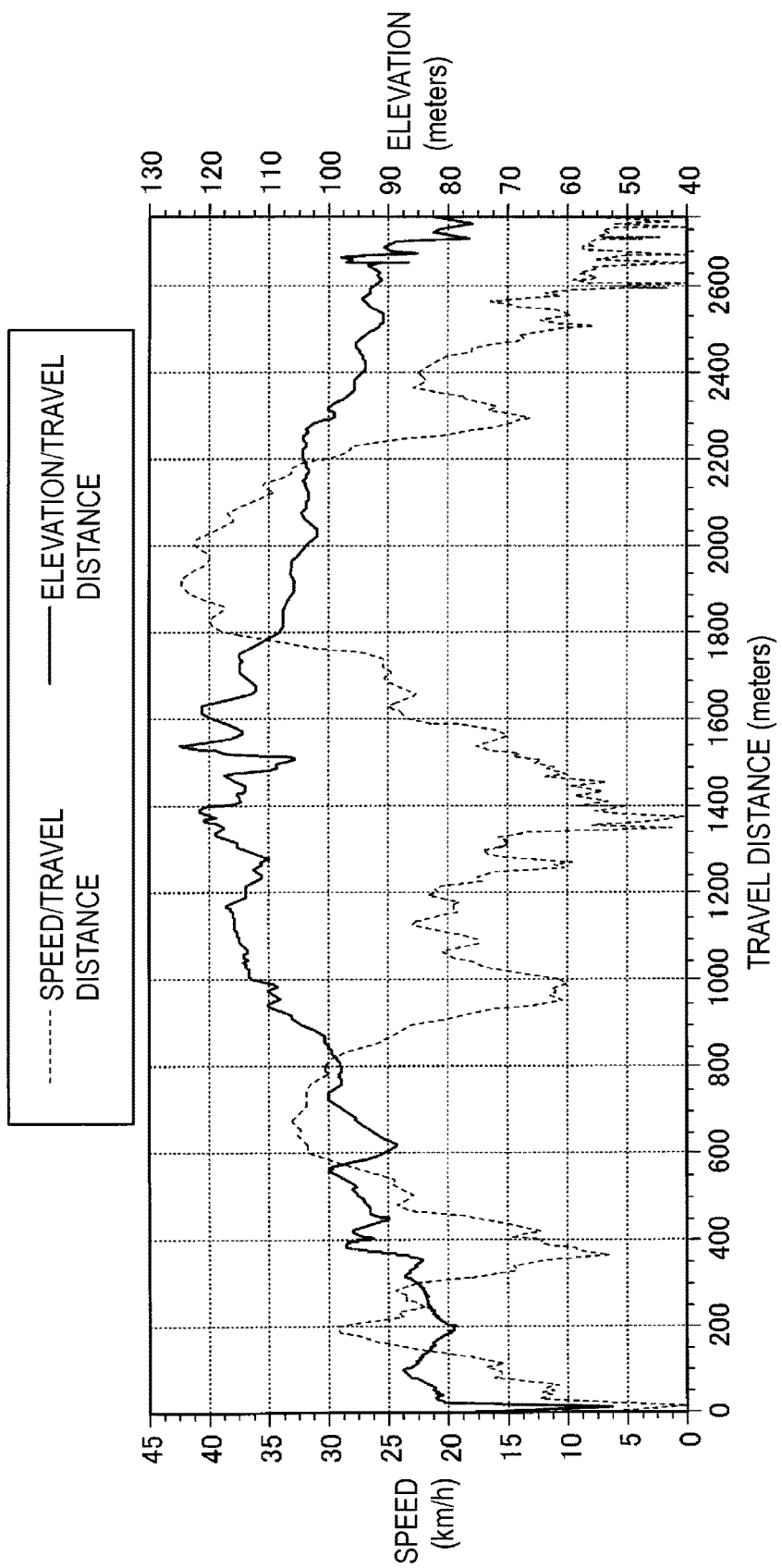
FIG. 9 is a chart illustrating an example of a graph that indicates a driving status of a vehicle.

In the aforementioned embodiment, the travel route display device 1 may display a graph that indicates the driving status of the vehicle 2. FIG. 9 is a chart illustrating an example of a graph that indicate the driving status of the vehicle. FIG. 9 illustrates a graph that indicates the relationship between the speed and travel distance of the vehicle 2, and a graph that indicates the relationship between the elevation and travel distance of the vehicle 2. The travel route display device 1 may display, on the display unit 130, the graphs illustrated in FIG. 9 and the images illustrated in FIGS. 5 to 8 simultaneously, or may display, on the display unit 130, the graphs illustrated in FIG. 9 separately from the images illustrated in FIGS. 5 to 8. The variables (for example, speed, acceleration, gradient, elevation, travel distance, atmospheric pressure, and the like) of the graphs to be displayed can be set beforehand and changed afterward by the user.

Figure 10:
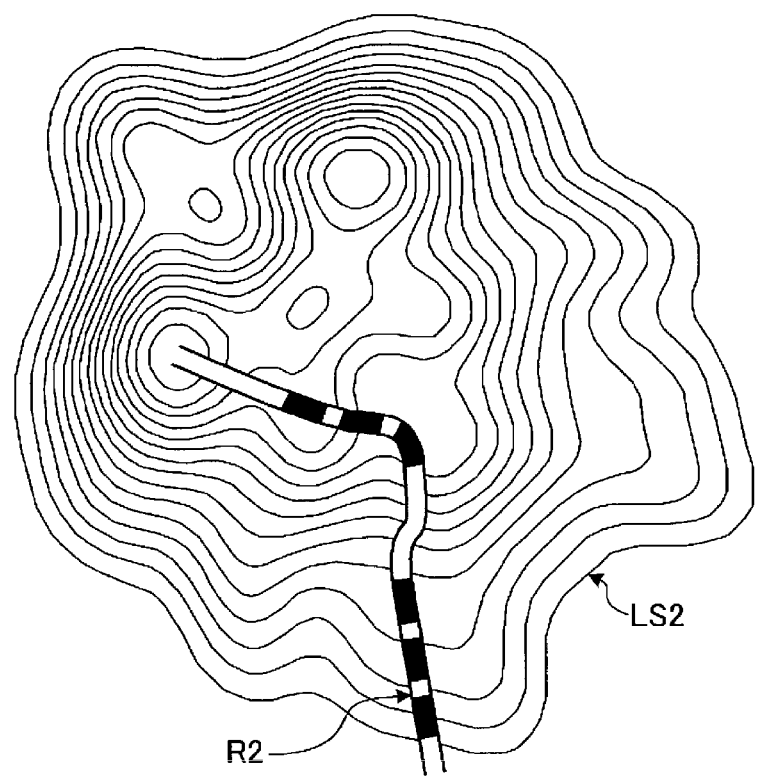
FIG. 10 is a drawing illustrating another example of a topographical image and a travel route image displayed simultaneously on a display unit.

Furthermore, the travel route display device 1 may display a topographical image and a travel route image simultaneously on the display unit 130 in two dimensions. FIG. 10 is a drawing illustrating another example of a topographical image and a travel route image displayed simultaneously on the display unit. FIG. 10 illustrates a state in which a topographical image LS2 and a travel route image R2 are displayed simultaneously on the display unit 130 in two dimensions.

In the aforementioned embodiment, an example has been described in which the travel route display device 1 changes the display mode for a travel route with respect to a portion where at least one of the speed, gradient, and acceleration is equal to or greater than a prescribed value; however, the present technology is not limited thereto. For example, the travel route display device 1 may change the display mode for the travel route with respect to a section where at least one of the speed, gradient, and acceleration is within a range of a prescribed value.

In the aforementioned embodiment, an example has been described in which the travel route display device 1, on the basis of measurement data acquired from the vehicle 2, executes computations or the like as necessary to calculate data relating to the driving status, and stores the data in the storage unit 110; however, the present technology is not limited thereto. For example, processing for the calculation of data relating to the driving status may be performed on the vehicle 2 side.

In the aforementioned embodiment, an example has been described in which the travel route display device 1 displays, together with a topographical image, a travel route image in which a portion to be displayed where at least one of the speed, gradient, and acceleration is equal to or greater than a prescribed value has been altered. In addition, with these images displayed on the display unit or the like which is mounted on the vehicle 2, guidance or the like for the driving method may be given. For example, when the vehicle has approached a section in which the gradient is equal to or greater than a prescribed value and the wear of the tires will become more severe, for example, guidance on a driving manner may be given by a method of outputting support information (audio or image) such that the engine speed is brought to a prescribed value or less.

What is claimed is:

1. A travel route display device comprising:
a display unit;
a topographical data storage unit that stores three-dimensional topographical data;
a travel data storage unit that stores travel data relating to a travel route of a vehicle and a driving status of the vehicle on the travel route, wherein the travel data includes, in association with a position of the vehicle, at least two selected from: a speed of the vehicle, an acceleration of the vehicle, or a gradient of the vehicle as the driving status; and
a control unit that, when displaying the topographical data stored in the topographical data storage unit on the display unit while the vehicle is driving, simultaneously displays, on the display unit, the travel route indicated by the travel data stored in the travel data storage unit in a display mode that corresponds to the driving status, wherein the control unit, when displaying the travel route, changes the display mode in accordance with a change of at least two selected from: the speed of the vehicle, the acceleration of the vehicle, or the gradient of the vehicle, and wherein the control unit, when displaying the travel route, draws the travel route as a line or dots, and the control unit sets: a width of the line of a portion where at least two selected from the speed, gradient or acceleration are equal to or greater than prescribed values to be wider, a thickness of the line of the portion to be greater, or a size of the dots of the portion to be larger than those of other portions.

2. The travel route display device according to claim 1, wherein the control unit draws the travel route as a line, and changes a width of the line on the travel route based on the driving status.

3. The travel route display device according to claim 2, wherein the control unit, when displaying the travel route, adds information that indicates an advancement direction of the vehicle.

4. The travel route display device according to claim 2, wherein the control unit, when displaying the travel route, causes a display mode for a section in which the driving status is within a range of a prescribed value to be different from a display mode for another section.

5. The travel route display device according to claim 1, wherein the control unit draws the travel route as a line having a three-dimensional thickness in a direction perpendicular to the travel route, and changes the thickness based on the driving status.

6. The travel route display device according to claim 5, wherein the control unit, when displaying the travel route, adds information that indicates an advancement direction of the vehicle.

7. The travel route display device according to claim 5, wherein the control unit, when displaying the travel route, causes a display mode for a section in which the driving status is within a range of a prescribed value to be different from a display mode for another section.

8. The travel route display device according to claim 1, wherein the control unit draws the travel route as a dotted line that includes a plurality of dots, and changes a size of the dots included in the dotted line based on the driving status.

9. The travel route display device according to claim 8, wherein the control unit, when displaying the travel route, adds information that indicates an advancement direction of the vehicle.

10. The travel route display device according to claim 8, wherein the control unit, when displaying the travel route, causes a display mode for a section in which the driving status is within a range of a prescribed value to be different from a display mode for another section.

11. The travel route display device according to claim 1, wherein the control unit, when displaying the travel route, adds information that indicates an advancement direction of the vehicle.

12. The travel route display device according to claim 1, wherein the control unit, when displaying the travel route, causes a display mode for a section in which the driving status is within a range of a prescribed value to be different from a display mode for another section.

13. A non-transitory travel route display program allowing a computer to execute the steps of:

acquiring three-dimensional topographical data from a topographical data storage unit that stores the topographical data;
acquiring travel data relating to a travel route of a vehicle and a driving status of the vehicle on the travel route from a travel data storage unit that stores the travel data, wherein the travel data includes, in association with a position of the vehicle, at least two selected from: a speed of the vehicle, an acceleration of the vehicle, or a gradient of the vehicle as the driving status;
when displaying the topographical data on a display unit while the vehicle is driving, simultaneously displaying, on the display unit, the travel route indicated by the travel data stored in the travel data storage unit in a display mode that corresponds to the driving status;
when displaying the travel route, changing the display mode in accordance with a change of at least two selected from: the speed of the vehicle, the acceleration of the vehicle, or the gradient of the vehicle; and
when displaying the travel route, drawing the travel route as a line or dots and setting: a width of the line of a portion where at least two selected from the speed, gradient or acceleration are equal to or greater than prescribed values to be wider; a thickness of the line of the portion to be greater; or a size of the dots of the portion to be larger than those of other portions.

14. A travel route display device comprising:
a display unit;
a topographical data storage unit that stores three-dimensional topographical data;
a travel data storage unit that stores travel data relating to a travel route of a vehicle and a driving status of the vehicle on the travel route, wherein the travel data includes, in association with a position of the vehicle, at least two selected from: a speed of the vehicle, an acceleration of the vehicle, or a gradient of the vehicle as the driving status; and
a control unit that, when displaying the topographical data stored in the topographical data storage unit on the display unit while the vehicle is driving, simultaneously displays, on the display unit, the travel route indicated by the travel data stored in the travel data storage unit in a display mode that corresponds to the driving status, wherein the control unit, when displaying the travel route, changes the display mode in accordance with a change of at least two selected from: the speed of the vehicle, the acceleration of the vehicle, or the gradient of the vehicle, wherein the control unit, when displaying the travel route, draws the travel route as a line or dots, and the control unit sets: a width of the line of a portion where at least two selected from the speed, gradient or acceleration are equal to or greater than prescribed values to be wider, a thickness of the line of the portion to be greater, or a size of the dots of the portion to be larger than those of other portions; and wherein the control unit sets the width of the line, the thickness of the line, or the size of the dots to increase as an amount of deviation from the prescribed value increases.

15. A travel route display device comprising:
a display unit;
a topographical data storage unit that stores three-dimensional topographical data;
a travel data storage unit that stores travel data relating to a travel route of a vehicle and a driving status of the vehicle on the travel route, wherein the travel data includes, in association with a position of the vehicle, at least two selected from: a speed of the vehicle, an acceleration of the vehicle, or a gradient of the vehicle as the driving status; and
a control unit that, when displaying the topographical data stored in the topographical data storage unit on the display unit while the vehicle is driving, simultaneously displays, on the display unit, the travel route indicated by the travel data stored in the travel data storage unit in a display mode that corresponds to the driving status, wherein the control unit, when displaying the travel route, changes the display mode in accordance with a change of at least two selected from: the speed of the vehicle, the acceleration of the vehicle, or the gradient of the vehicle, wherein the control unit, when displaying the travel route, draws the travel route as a line or dots, and the control unit simultaneously displays a first portion where one of the speed, gradient or acceleration is equal to or greater than a prescribed value, and a second portion where another one of the speed, gradient or acceleration is equal to or greater than the prescribed value; sets to be larger than those of other portions: a width of the line of the first portion, a thickness of the line of the first portion, or a size of the dots of the first portion; and sets a color of the second portion to be a color that is different from a color of other portions.

16. A non-transitory travel route display program allowing a computer to execute the steps of:
acquiring three-dimensional topographical data from a topographical data storage unit that stores the topographical data;
acquiring travel data relating to a travel route of a vehicle and a driving status of the vehicle on the travel route from a travel data storage unit that stores the travel data, wherein the travel data includes, in association with a position of the vehicle, at least two selected from: a speed of the vehicle, an acceleration of the vehicle, or a gradient of the vehicle as the driving status;
when displaying the topographical data on a display unit while the vehicle is driving, simultaneously displaying, on the display unit, the travel route indicated by the travel data stored in the travel data storage unit in a display mode that corresponds to the driving status;
when displaying the travel route, changing the display mode in accordance with a change of at least two selected from: the speed of the vehicle, the acceleration of the vehicle, or the gradient of the vehicle; and
when displaying the travel route, drawing the travel route as a line or dots and setting: a width of the line of a portion where at least two selected from the speed, gradient or acceleration are equal to or greater than prescribed values to be wider; a thickness of the line of the portion to be greater; or a size of the dots of the portion to be larger than those of other portions; and further setting the width of the line, the thickness of the line, or the size of the dots to increase as an amount of deviation from the prescribed value increases.

17. A non-transitory travel route display program allowing a computer to execute the steps of:
acquiring three-dimensional topographical data from a topographical data storage unit that stores the topographical data;
acquiring travel data relating to a travel route of a vehicle and a driving status of the vehicle on the travel route from a travel data storage unit that stores the travel data, wherein the travel data includes, in association with a position of the vehicle, at least two selected from: a speed of the vehicle, an acceleration of the vehicle, or a gradient of the vehicle as the driving status;

when displaying the topographical data on a display unit while the vehicle is driving, simultaneously displaying, on the display unit, the travel route indicated by the travel data stored in the travel data storage unit in a display mode that corresponds to the driving status;

when displaying the travel route, changing the display mode in accordance with a change of at least two selected from: the speed of the vehicle, the acceleration of the vehicle, or the gradient of the vehicle;

when displaying the travel route, drawing the travel route as a line or dots;

simultaneously displaying a first portion where one of the speed, gradient or acceleration is equal to or greater than a prescribed value, and a second portion where another one of the speed, gradient or acceleration is equal to or greater than the prescribed value;

setting to be larger than those of other portions: a width of the line of the first portion, a thickness of the line of the first portion, or a size of the dots of the first portion; and setting a color of the second portion to be a color that is different from a color of other portions.

* * * * *